Oct. 9, 1956 M. R. HUBBARD 2,766,383

TUNING DEVICE

Filed Sept. 18, 1952 2 Sheets-Sheet 1

INVENTOR.
MERLE R. HUBBARD
BY Marvin Moody
ATTORNEY

INVENTOR.
MERLE R. HUBBARD
BY Marvin Moody
ATTORNEY 2,766,383

TUNING DEVICE

Merle R. Hubbard, Cedar Rapids, Iowa, assignor to Collins Radio Company, Cedar Rapids, Iowa, a corporation of Iowa Application September 18, 1952, Serial No. 310,290

4 Claims. (Cl. 250—40)

This invention relates in general to very high and ultra high frequency tunable devices.

Ultra high and very high frequencies are being used more and more and the need arises for tuning devices which are simple and compact that may be tuned over these ranges. The use of flat plate lines has been more or less prevalent in ultra high and very high tuned circuits and these generally consist of a ground plate with a flat plate suspended above it relatively close spaced. One end of the flat plate is connected to a vacuum tube plate or grid and the other end of the flat plate is connected to ground at a point such that the length from the tube to ground and the capacity per unit length along with the internal tube capacity, forms a tuned circuit at some desired frequency.

It is an object of my invention to construct a tunable flat plate type line from a plurality of plates and with a suitable shorting bar to thus obtain a variable tuned circuit in which both the inductance and capacitance is shorted to produce rather large values of frequency change.

Another object of this invention is to provide a variable tuned circuit for the very high and ultra high frequency ranges.

Further objects, features and advantages of the invention will become apparent from the following description and claims when read in view of the drawings, in which;

Figure 1:
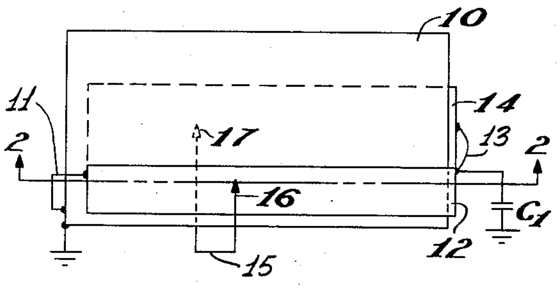
Figure 1 is a top schematic view of a tuner according to my invention.

Figure 1 illustrates schematically a first plate 10 which has one end connected to ground and which is connected by a short conducting member 11 to an inductance plate 12. The inductance plate 12 is joined by a coupling member 13 to an inductance-capacitance plate 14 which extends back parallel to the other plates on the other side of plate 10. A load capacitor $C_1$ is connected from the member 13 to ground. A shorting plunger 15 has contacts 16 and 17 which engage, respectively, plates 12 and 14. As shown in Figure 1 the plates 10, 12 and 14 may have different widths.

Figure 2:
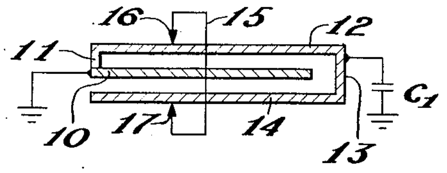
Figure 2 is a sectional view of a tuner according to my invention.

Figure 2 is a sectional view of a structure according to my invention. Note that the short conducting member 11 joins first ends of plates 10 and 12 and the coupling member 13 joins the other end of plate 12 and one end of plate 14. It is to be realized that the plates may vary in width.

When the shorting bar 15 is at the extreme left relative to Figure 2, the characteristic impedance of the assembly will be very low and will depend on the width of the elements, spacing, and the dielectric of the spacing material. When the shorting bar is at the right relative to Figure 2, the inductance element comprising the plate 12 is from the load capacitor $C_1$ to ground and the inductance-capacitance element 14 appears as capacity from the load end to ground. Thus, the inductance element remaining in the circuit under these conditions has a much higher characteristic impedance than before, thus assisting in the total change in frequency.

Figure 3:
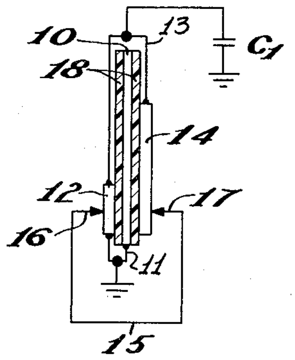
Figure 3 is an end view of a modification of my invention.

A dielectric material may be inserted between the plates 10, 12 and 14, as shown in Figure 3 where it is designated by the numeral 18. This varies the tuning range of the device. It is to be noted that the end view of Figure 3 also shows variation in width of the metal plates.

The apparatus shown in Figures 4, 5, 6 and 7 is a modification wherein the plates have been formed into a substantially annular form to allow the shorting plunger to be controlled with a central shaft.

Figure 4:
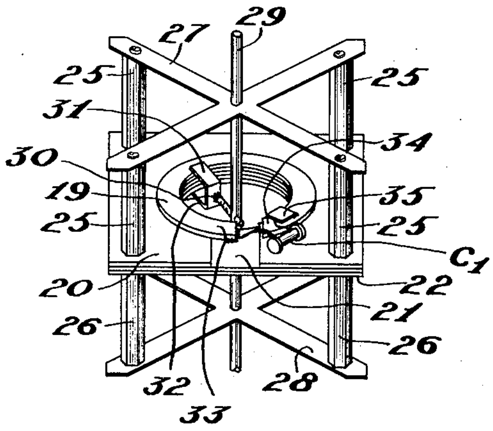
Figure 4 is an isometric view of another modification.

Referring particularly to Figure 4, a first annular ring 19 has a break in its periphery and is supported on a generally rectangular sheet 20 which is made of insulating material, as for example, Bakelite.

A square metallic plate 21 is mounted beneath the insulating plate 20. A second insulating plate 22 is square and is mounted below the conducting plate 21.

Figure 5:
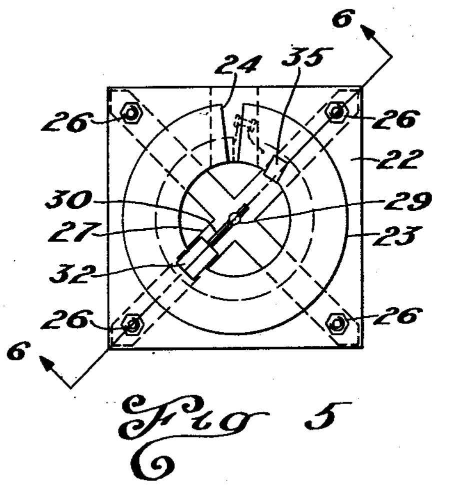
Figure 5 is a bottom view of the modification shown in Figure 4.

As best shown in Figure 5 a second annular member 23 is mounted to the under side of the plate 22 and has an opening 24 formed in its periphery.

A plurality of stand-offs 25 are attached to the plate 20 and a second plurality of stand-offs are attached to the opposite side of the assembly and to the plate 22. X-shaped members 27 and 28, respectively, are attached to the end of the stand-offs 25 and 26 and a shaft 29 is rotatably supported therebetween and passes through the opening formed through the plate assembly. The shaft 29 is formed of a suitable plastic and is of insulating material. A wiper contact 30 is supported by the shaft 29 and has legs 31 and 32 which engage, respectively, the rings 19 and 23.

The upper ring 19 has one end 33 electrically connected to the plate 21 and its opposite end 34 is connected by a jumper 35 to the plate 23. A condenser $C_1$ is connected between the ends 33 and 34 of ring 19.

Figure 7:
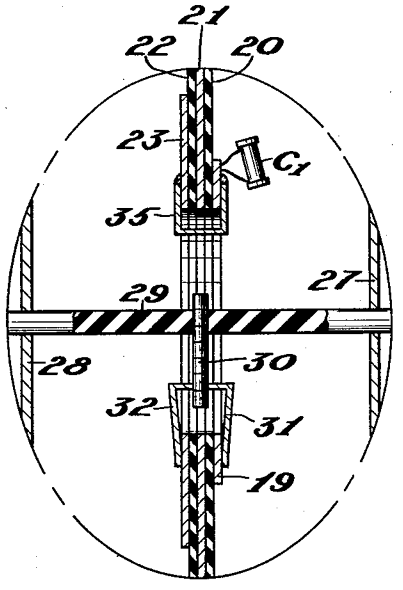
Figure 7 is a detail view taken from Figure 6.
Figure 6:
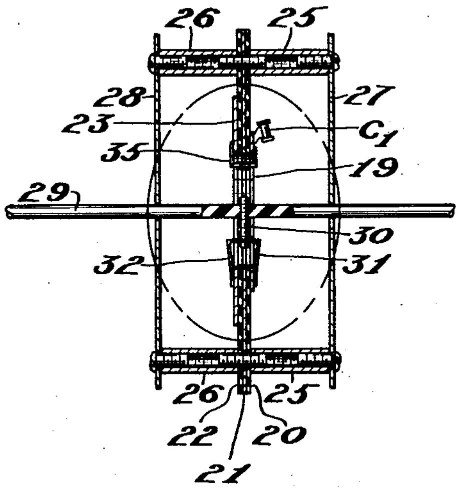
Figure 6 is a sectional view taken on line 6—6 of Figure 5.

Figures 6 and 7 show in greater detail the construction of the apparatus of Figure 4.

The apparatus shown in Figures 4, 5, 6 and 7 give the same tuning characteristic of the apparatus shown in Figures 1, 2 and 3 and the only difference is that the elements are put in a circle and the shorting bar is connected to a rotating shaft. The width of the ring elements 19 and 23 may be shaped to get various tuning curves.

The advantages of such a tuning device is that considerable space can be saved. Also, the dielectric constant may be varied by choosing various materials and thus varying the tuning range. The use of dielectric material allows tuners to be built which are smaller in size than those presently being used. When dielectric is used, the electrical field will be highly concentrated within the dielectric medium and is less apt to give a large radiation field, thus simplifying the shielding problem. The use of printed circuit techniques may be applied to this invention to obtain very small tuners.

Although the invention has been described with respect to a preferred embodiment thereof, it is not to be so limited as changes and modifications may be made therein which are within the full intended scope of the invention, as defined by the appended claims.

I claim:

1. A tuning device comprising, first, second and third plates of substantially the same lengths and of conducting material, the first end of the first plate electrically connected to the first end of the second plate, the second end of the second plate electrically connected to one end of the third plate, the first plate mounted between the second and third plates, the first end of the first plate connected to ground, a capacitor connected between the second end of the second plate and ground, and a shorting plunger slidable relative to the plates and electrically connecting the second and third plates.

2. A tuning device comprising, first, second and third plates of substantially the same lengths and mounted parallel to each other with the first plate between the second and third plates, first and second dielectric means spaced respectively between the first and second and first and third plates, the first end of the first plate connected electrically to the first end of the second plate, the second end of the second plate connected electrically to one end of the third plate, a shorting plunger engageable with the second and third plates and movable longitudinally relative thereto to connect them electrically together, and a capacitor connected between the second end of the second plate and ground.

3. A tuning device comprising, first, second and third plates generally annular in shape but formed with a break so as to insulate the ends from each other, the first plate mounted between the second and third plates, the first end of the first plate connected electrically to the first end of the second plate, the second end of the second plate connected electrically to one end of the third plate, an insulating shaft rotatably supported transversely of said substantially annular plates and extending through their center openings, and a wiper contact carried on said insulated shaft and engageable with the second and third plates.

4. A tuning device comprising, three plates which are generally annular in shape but which have a break formed in their peripheries so as to form first and second ends of said plates, first and second sheets of dielectric material separating the first and second and the first and third plates, the first end of the first plate connected electrically to the first end of the second plate, the second end of the second plate connected electrically to the second end of the third plate, a wiper contact rotatably supported and engageable with the second and third plates, and a capacitor connected between the second end of the second plate and ground.

References Cited in the file of this patent

UNITED STATES PATENTS

| | | |
|---|---|---|
| 2,341,345 | Van Billiard | Feb. 8, 1944 |
| 2,384,504 | Thias | Sept. 11, 1945 |
| 2,624,042 | Loe | Dec. 30, 1952 |
| 2,631,241 | Schmidt | Mar. 10, 1953 |